(12) United States Patent
Zuras, Jr. et al.

(10) Patent No.: US 6,516,108 B1
(45) Date of Patent: Feb. 4, 2003

(54) OPTICALLY CONTROLLED EXCHANGE SWITCHES WITHIN AN OPTICAL SIGNAL NETWORK

(75) Inventors: George D. Zuras, Jr., San Jose, CA (US); William H. McAllister, Saratoga, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 09/293,327

(22) Filed: Apr. 16, 1999

(51) Int. Cl.[7] .................................................. G02B 6/35
(52) U.S. Cl. .............................. 385/17; 385/16; 385/18; 385/19; 385/25
(58) Field of Search ................................. 385/15–18, 4, 385/5, 19

(56) References Cited

U.S. PATENT DOCUMENTS

| | | | |
|---|---|---|---|
| 4,988,157 A | | 1/1991 | Jackel et al. ............. 350/96.13 |
| 5,699,462 A | | 12/1997 | Fouquet et al. ................ 385/18 |
| 5,732,168 A | * | 3/1998 | Donald |
| 5,960,131 A | * | 9/1999 | Fouquet et al. |
| 5,978,527 A | * | 11/1999 | Donald |
| 6,072,924 A | * | 6/2000 | Sato et al. |
| 6,154,586 A | * | 11/2000 | MacDonald et al. |
| 6,208,778 B1 | * | 3/2001 | Donald |

* cited by examiner

Primary Examiner—Frank G. Font
Assistant Examiner—Michael P. Mooney

(57) ABSTRACT

An exchange switch for an optical switching network utilizes the manipulation of fluid to selectively exchange outputs for two optical transmission paths. That is, when the switch is in a signal-exchange state, first and second transmission paths reciprocally exchange optical signals that are received at input waveguides of the transmission paths. In one embodiment, the exchange switch includes an optical switching arrangement having first and second switching members. The first switching member is positioned to selectively interrupt the continuation of signal propagation along the first transmission path, while the second switching member is positioned to selectively interrupt the continuation of signal propagation along the second transmission path. When fluid resides within the chambers of the two switching members, the exchange switch is in a signal-continuation state. However, by evacuating fluid from the chambers, a signal propagating along one of the transmission paths will be reflected into an exchange waveguide that transfers the optical signal to the other transmission path. In other embodiments, the exchange switch includes at least one fluid-manipulable chamber and a steady-state reflector. The different elements cooperate to enable either signal continuation or signal exchange, depending on the states of the fluid-manipulable chambers.

20 Claims, 6 Drawing Sheets

OPTICALLY CONTROLLED EXCHANGE SWITCHES WITHIN AN OPTICAL SIGNAL NETWORK

TECHNICAL FIELD

The invention relates generally to optical switching arrangements and more particularly to exchange switches that enable two or more transmission paths to exchange outputs.

BACKGROUND ART

It is conventional to transfer information between nodes of a telecommunications and data communications network by transmitting electrical signals via electrically conductive lines. However, an alternative medium of data exchange is the transmission of optical signals through optical fibers. Information is exchanged in the form of modulations of laser-produced light. The equipment for efficiently generating and transmitting the optical signals has been designed and implemented, but the design of optical switches for use in telecommunications and data communications networks is problematic. As a result, switching requirements within a network that transmits optical signals is often satisfied by converting the optical signals to electrical signals at the inputs of a switching network, then reconverting the electrical signals to optical signals at the outputs of the switching network.

Recently, reliable optical switching systems have been developed. U.S. Pat. No. 5,699,462 to Fouquet et al., which is assigned to the assignee of the present invention, describes a switching matrix that may be used for routing optical signals from parallel input optical fibers to parallel output optical fibers. Another such matrix of switching elements is described in U.S. Pat. No. 4,988,157 to Jackel et al. An isolated switching element 10 is shown in FIG. 1, while a 4×4 matrix 32 of switching elements is shown in FIG. 2. The optical switch of FIG. 1 is formed on a substrate. The substrate may be a silicon substrate, but other materials may be used. The optical switch 10 includes planar waveguides defined by a lower cladding layer 14, a core 16, and an upper cladding layer, not shown. The core is primarily silicon dioxide, but with other materials that achieve a desired index of refraction for the core. The cladding layers should be formed of a material having a refractive index that is substantially different from the refractive index of the core material, so that optical signals are guided along the waveguides.

The material core 16 is patterned to form an input waveguide 20 and an output waveguide 26 of a first optical path and to define a second input waveguide 24 and a second output waveguide 22 of a second optical path. The upper cladding layer is then deposited over the patterned core material. A gap 28 is formed by etching a trench through the core material and the two cladding layers to the substrate. The waveguides intersect the trench at an angle of incidence greater than the critical angle of total internal reflection (TIR) when the location 30 aligned with the waveguides is filled with a vapor or gas. Thus, TIR diverts light from the input waveguide 20 to the output waveguide 22, unless an index-matching fluid resides within the location 30 between the aligned waveguides 20 and 26. The trench 28 is positioned with respect to the four waveguides such that one sidewall of the trench passes through or slightly offset from the intersection of the axes of the waveguides.

The above-identified patent to Fouquet et al. describes a number of alternative approaches to switching the switching element 10 between a transmissive state and a reflective state. The element includes at least one heater that can be used to manipulate fluid within the gap 28. One approach is illustrated in FIG. 1. The switching element 10 includes two microheaters 50 and 52 that control the position of a bubble within the fluid-containing gap. The fluid within the gap has a refractive index that is close to the refractive index of the core material 16 of the four waveguides 20–26. Fluid fill-holes 54 and 56 may be used to provide a steady supply of fluid, but this is not critical. In the operation of the switching element, one of the heaters 50 and 52 is brought to a temperature sufficiently high to form a gas bubble. Once formed, the bubble can be maintained in position with a reduced current to the heater. In FIG. 1, the bubble is positioned at the location 30 of the intersection of the four waveguides. Consequently, an input signal along the waveguide 20 will encounter a refractive index mismatch upon reaching the gap 28. This places the switching element in a reflective state, causing the optical signal along the waveguide 20 to be redirected to the output waveguide 22. However, even in the reflective state, the second input waveguide 24 is not in communication with the output waveguide 26.

If the heater 50 at location 30 is deactivated and the second heater 52 is activated, the bubble will be attracted to the off-axis heater 52. This allows index-matching fluid to fill the location 30 at the intersection of the waveguides 20–26. The switching element 10 is then in a transmitting state, since the input waveguide 20 is optically coupled to the collinear waveguide 26.

In the 4×4 matrix 32 of FIG. 2, any of the four input waveguides 34, 36, 38 and 40 may be optically coupled to any one of the four output waveguides 42, 44, 46 and 48. The switching matrix is sometimes referred to as a "non-blocking" matrix, since any free input fiber can be connected to any free output fiber, regardless of which connections have already been made through the switching matrix. Each of the sixteen optical switches has a gap that causes TIR in the absence of a fluid at the location between collinear waveguides, but collinear waveguides of a particular waveguide path are optically coupled when the locations between the waveguides are filled with the fluid. Trenches that are in the transmissive state are represented by fine lines that extend at an angle through the intersections of the optical waveguides in the matrix. On the other hand, trenches of switching elements in a reflective state are represented by broad lines through points of intersection.

In FIGS. 1 and 2, the input waveguide 20 is in optical communication with the output waveguide 22, as a result of TIR at the empty location 30 of the gap 28. Since all other cross points for allowing the input waveguide 34 to communicate with the output waveguide 44 are in a transmissive state, a signal that is generated at input waveguide 34 will be received at output waveguide 44. In like manner, the input waveguide 36 is optically coupled to the first output waveguide 42, the third input waveguide 38 is optically coupled to the fourth output waveguide 48, and the fourth input waveguide 40 is optically coupled to the third output waveguide 46.

In FIG. 1, the second input waveguide 24 can be optically coupled to the second output waveguide 22, but is isolated from the output waveguide 26. This is because the axes of the waveguides 24 and 26 do not intersect at the trench wall where reflection will occur when the switching element is in the reflective state. That is, in the reflective state of FIG. 1, an optical signal along the second input waveguide 24 is unable to reach either of the two output waveguides 22 and 26, since total internal reflection will occur at the interface of the second input waveguide 24 with the trench 28.

It follows that the matrix 32 of FIG. 2 has limitations regarding transferring signals among waveguides. While any of the four input waveguides 34–40 can be connected to any one of the downwardly extending output waveguides 42–48, each input waveguide can be optically coupled to only one of the rightwardly extending waveguides 58, 60, 62 and 64. Specifically, each input waveguide can be connected to only the rightwardly extending waveguide that is optically aligned with that input waveguide.

What is needed is an exchange switch for an optical switching network, so that a greater versatility in directing optical signals among available transmission paths is achieved.

SUMMARY OF THE INVENTION

An exchange switch for an optical switching network manipulates fluid into and out of alignment with optical transmission paths in order to enable exchanges of optical signals between two separate transmission paths. That is, the fluid is manipulated to allow two inputs to exchange outputs. The exchange switch includes an optical switching arrangement that is defined by at least two fluid-manipulable chambers. The optical switching arrangement has a signal-continuation state in which optical signals remain on their respective transmission paths without interruption and has a signal-exchange state in which the optical coupling to outputs is reversed.

In a first embodiment, the optical switching arrangement includes first and second switching members. The transmission paths are formed of waveguides. The first switching member is positioned to selectively interrupt the continuation of the first transmission path, while the second switching member is positioned to selectively interrupt the continuation of the second transmission path. The switching members have transmissive conditions in which fluid resides along the transmission paths and have reflective conditions in which there is an absence of fluid along the transmission paths. The fluid has a refractive index that generally matches the refractive index of the core material of the waveguides. Thus, when the fluid of a switching member is aligned with the corresponding transmission path, optical signals propagate through the fluid from an input waveguide to an output waveguide. On the other hand, when the fluid of a switching member is misaligned with the corresponding transmission path, reflection occurs at the interface of the input waveguide and the fluid-manipulable chamber of the switching member.

In this first embodiment, an exchange path intersects the input waveguide of the first transmission path at the first switching member. Consequently, when the first switching member is in the reflective state, an optical signal along the input waveguide is reflected to the first exchange path. The opposite end of the first exchange path intersects the output waveguide of the second transmission path at the second switching member. As a result, when the first and second switching members are both in the reflective condition, an optical signal along the first transmission path is transferred to the output waveguide of the second transmission path.

A second exchange path is connected in a similar manner to that of the first exchange path, but is optically coupled between the input waveguide of the second transmission path and the output waveguide of the first transmission path. When both of the switching members are in the reflective condition, an optical signal along the second transmission path is transferred to the output waveguide of the first transmission path.

In a second embodiment, the switching arrangement includes steady-state reflectors in addition to the fluid-manipulable chambers. While not critical, the reflectors may be gas-filled chambers that are similar to the fluid-manipulable chambers. This minimizes the number of different types of components that must be fabricated in order to form a switching matrix. In the exchange of signals from input waveguides of first and second linear transmission paths to output waveguides of the transmission paths, at least one steady-state reflector and at least one fluid-manipulable chamber must be utilized.

A single fluid-manipulable chamber may be used in this second embodiment by forming the first and second transmission paths to define an X configuration in which the axis of the input waveguide of the first transmission path intersects the axis of the output waveguide of the second transmission path at one wall of the fluid-manipulable chamber. Thus, when the chamber is in the signal-exchange state, the optical signals from the input waveguide of the first transmission path will be reflected directly to the output waveguide of the second transmission path. However, since the input waveguide of the second transmission path will not intersect the output waveguide of the first transmission path, the steady-state reflector is utilized to optically couple the two waveguides when the signal-exchange state is established. A first exchange waveguide extends from the input waveguide of the second transmission path to the reflector, and a second exchange waveguide extends from the reflector to the intersection of the fluid-manipulable chamber with the output waveguide of the first transmission path. This causes the optical signals in the input waveguide to follow a W-shaped path to the output waveguide of the other transmission path.

As an alternative second embodiment, a number of separate fluid-manipulable chambers may be used with the reflector to form an optical switching arrangement for first and second transmission paths. For example, there may be three fluid-manipulable chambers, with one chamber intersecting both of the transmission paths. In the signal-continuation state of the switching arrangement, optical signals along each of the two transmission paths must pass through the common chamber and one of the other two chambers. In the signal-exchange state, optical signals from the first transmission path are reflected to the second transmission path by the common chamber, while optical signals from the second path must follow a W-shaped path similar to the one described above.

An advantage of switching arrangements in accordance with the invention is that optical signals are freely transferrable from one transmission path to another transmission path. This increases the versatility of switching matrixes in optical signal networks. Versatility can be further enhanced by utilizing a matrix of the optical switching arrangements with a matrix of switching elements described in the above-identified patent to Fouquet et al. (U.S. Pat. No. 5,699,462). The combination of the two types of matrixes allow test signals and signal "dumping" to be incorporated into the network. The Fouquet et al switching matrix may be incorporated at either or both of the input and output ends of the matrix of the present invention.

DETAILED DESCRIPTION

Figure 3:
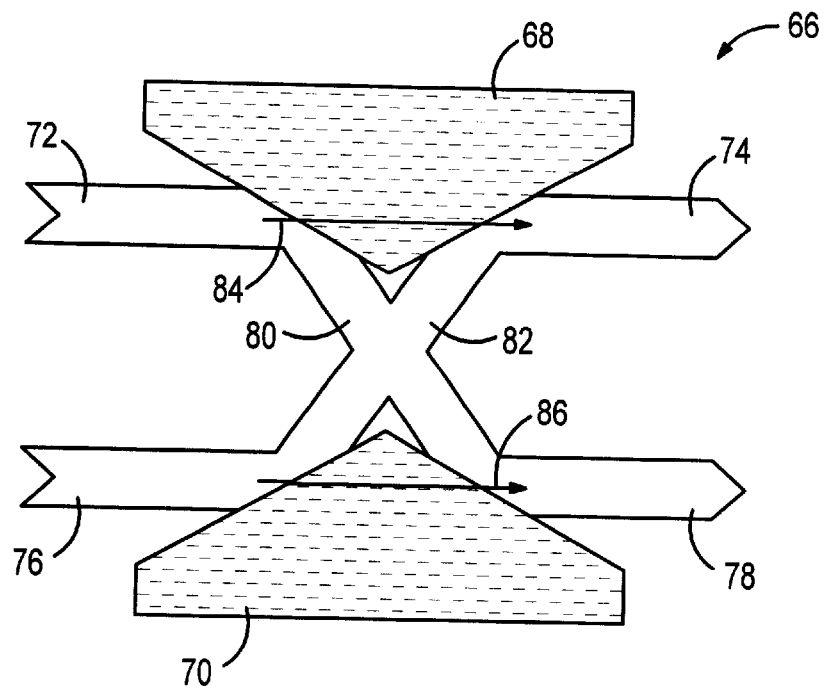
FIG. 3 is a top view of a first embodiment of a signal exchange switch in accordance with the invention, with the switch being shown in a signal-continuation state.

With reference to FIG. 3, a preferred embodiment of an exchange switch 66 is shown as including two separate fluid-manipulable chambers 68 and 70. The chambers are shown in the transmissive state, i.e., the condition in which fluid resides within the chamber. In contrast, the chambers are shown in the reflective state in FIG. 4, since the fluid has been removed from a substantial portion of the chamber.

Figure 1:
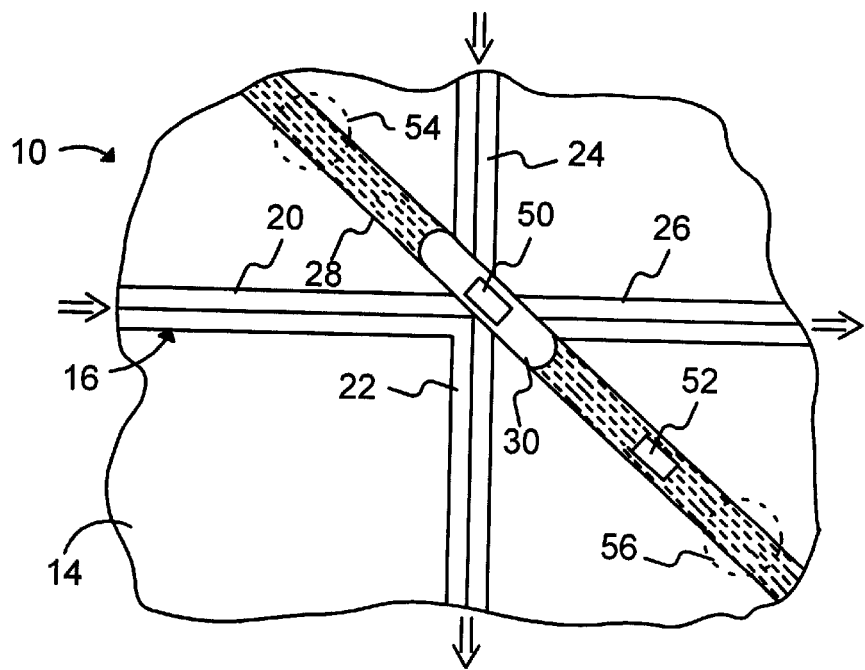
FIG. 1 is a top view of an optical switching element that utilizes total internal reflection in accordance with the prior art.

The approach for manipulating the fluid within the chambers 68 and 70 is not critical to the invention. One acceptable approach is to utilize a number of microheaters that control the position of a bubble within a fluid supply. This approach was described above, with reference to FIG. 1. At least one heater may be brought to a temperature sufficiently high to form a gas bubble. Once formed, the bubble can be maintained in position with a reduced current to the heater. If the heater is deactivated and a second heater is activated, the bubble will be attracted to the second heater. By properly positioning the different heaters, the bubble can be manipulated to toggle each chamber of the exchange switch 66 between transmissive and reflective states. Another approach to manipulating the fluid is to use inkjet techniques for firing fluid into and/or out of the chambers.

The exchange switch 66 includes a first input waveguide 72 and a first output waveguide 74 to define a transmission path that intersects the fluid-manipulable chamber 68. The waveguides of the exchange switches to be described below may be formed of a core material of silicon dioxide, but with one or more dopants that are selected to achieve a desired index of refraction for the core. While not shown, cladding layers are formed to encapsulate the core material. The cladding material is selected to provide a substantially different refractive index, so that optical signals are guided along the core material.

Figure 4:
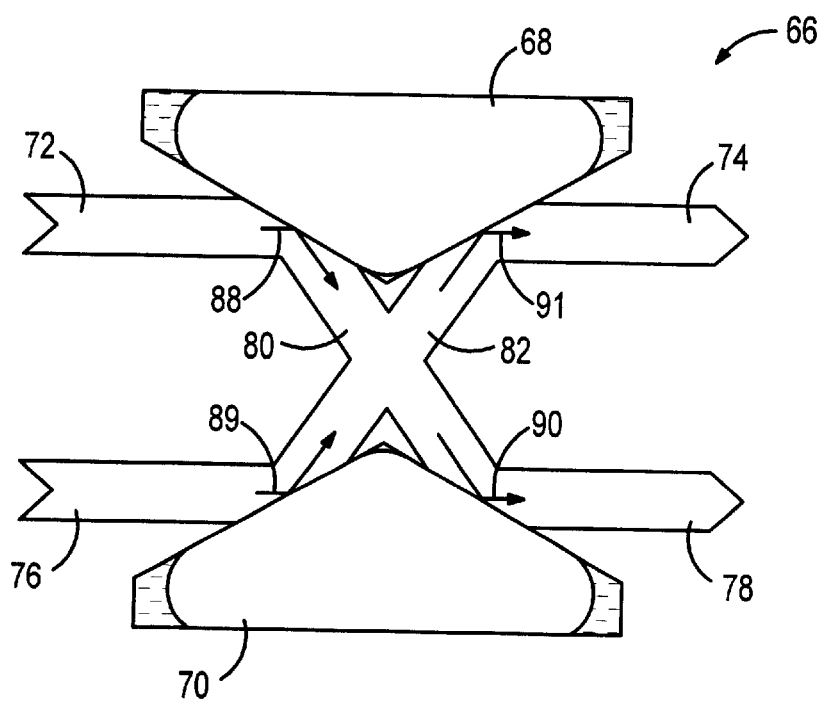
FIG. 4 is a top view of the switch of FIG. 3 shown in a signal-exchange state.

In FIGS. 3 and 4, a second transmission path is defined by coaxial second input and output waveguides 76 and 78. Two exchange waveguides 80 and 82 intersect the input waveguides 72 and 76 at first ends and intersect the output waveguides 74 and 78 at the opposite ends. The axes of the exchange waveguides intersect the axes of the input and output waveguides at the interfaces with the surfaces of the fluid-manipulable chambers 68 and 70. The intersecting axes are at angles greater than 90 degrees and less than 150 degrees. A more preferred range is 96 degrees to 135 degrees.

In operation, when the fluid within the chambers 68 and 70 fills the region along the two transmission paths, optical signals from the first input waveguide 72 will be output via the first output waveguide 74 and optical signals along the second input waveguide 76 will be output via the second output waveguide 78. The fluid is selected such that there is a close match between the indices of refraction of the fluid and the core material of the waveguides. Thus, in the signal-continuation state of the exchange switch 66, the exchange waveguides 80 and 82 will be inactive. In FIG. 3, signal propagation that occurs while the exchange switch is in this state is represented by arrows 84 and 86.

In FIG. 4, the exchange switch 66 is shown in the signal-exchange state. Fluid within the chambers 68 and 70 is no longer aligned with the transmission paths through the chambers. As a result, total internal reflection (TIR) occurs when an optical signal impinges upon a surface of one of the chambers. This is represented by arrows 88, 89, 90 and 91. Arrows 88 and 90 represent an exchange of an optical signal from the input waveguide 72 to the output waveguide 78, while arrows 89 and 91 represent an exchange of an optical signal from the input waveguide 76 to the output waveguide 74.

FIGS. 3 and 4 show the output waveguides 74 and 78 as being axially aligned with the corresponding input waveguides 72 and 76. However, there may be advantages to providing some offset between the corresponding input and output waveguides. If the refractive index of the fluid within the chambers 68 and 70 is imprecisely matched with the refractive index of the core material of the waveguides, some refraction will occur as the optical signals enter and exit the chambers. An offset may be used to compensate for the refraction.

While the waveguides have been described as being layers formed on a substrate, other structures for guiding optical signals may be utilized in the exchange switch 66, without departing from the invention. Moreover, while the waveguides have been described as being unidirectional with respect to conducting optical signals, the device of FIGS. 3 and 4 may be used in bidirectional communication systems.

Figure 5:
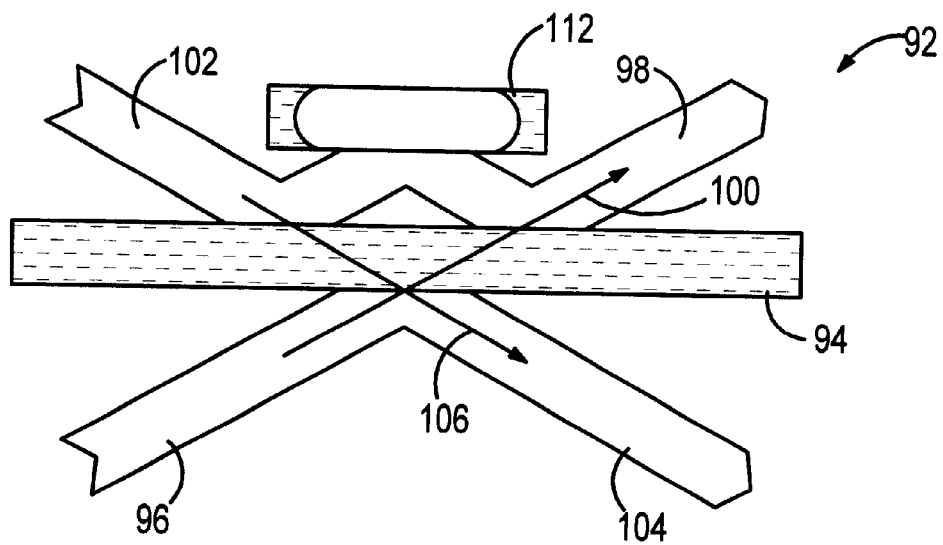
FIG. 5 is a top view of a second embodiment of an optical switching arrangement shown in a signal-continuation state.
Figure 6:
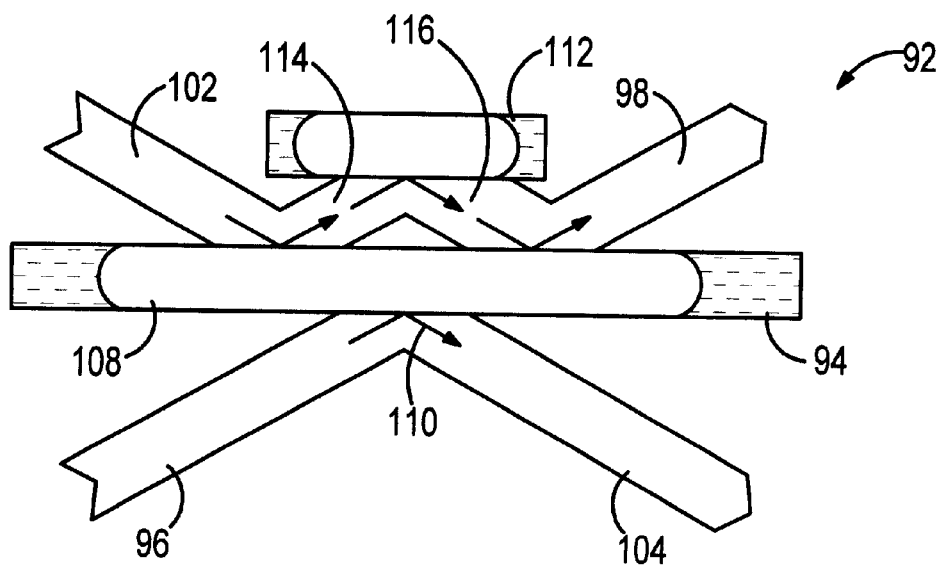
FIG. 6 is a top view of the switching arrangement of FIG. 5 shown in a signal-exchange state.

A second embodiment of an exchange switch 92 is shown in FIGS. 5 and 6. In this embodiment, there is only one chamber 94 in which fluid is manipulated in order to toggle the switch 92 from a signal-continuation state of FIG. 5 to a signal-exchange state of FIG. 6.

In FIG. 5, a first transmission path is formed by an input waveguide 96 and an output waveguide 98. An arrow 100 is used to illustrate the signal propagation along the first transmission path when the switch 92 is in the signal-continuation state, i.e., the chamber 94 is filled with fluid. A second transmission path is formed by coaxial input and output waveguides 102 and 104. Arrow 106 illustrates signal propagation from the second input waveguide to the second output waveguide when the switch 92 is in the signal-continuation state.

Referring now to FIG. 6, the region of the chamber 94 that is along the first and second transmission paths is shown as being occupied by a bubble 108. As a result, TIR will occur at the interfaces of the waveguides and the walls of the chamber 94. Arrow 110 represents the reflection of optical signals from the input waveguide 96 to the output waveguide 104, as optical signals from the first transmission path are transferred to the second transmission path. A steady-state reflector 112 is used to transfer the signals from the input waveguide 102 of the second transmission path to the output waveguide 98 of the first transmission path. The optical signals are reflected at the chamber 94 to a first exchange waveguide 114. The signals are redirected by the reflector 112 to a second exchange waveguide 116. Consequently, the signals again impinge the wall of the trench 94 and are redirected to the output waveguide 98 of the first transmission path.

The steady-state reflector 112 may be a chamber that is similar to the fluid-manipulable chamber 94. Alternatively, the reflector may be another type of structure that provides total internal reflection. However, the preferred embodiment is one in which the reflector 112 and the chamber 94 are formed simultaneously using the same fabrication techniques, since this facilitates the fabrication process.

Figure 7:
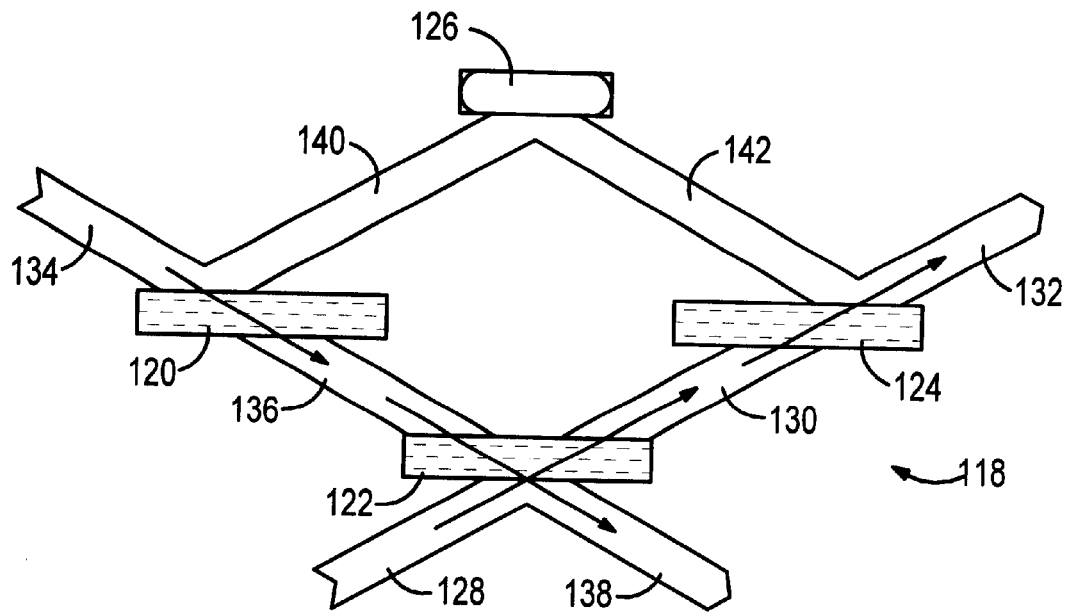
FIG. 7 is a top view of a third embodiment of a optical switching arrangement in accordance with the invention, shown in the signal-continuation state.
Figure 8:
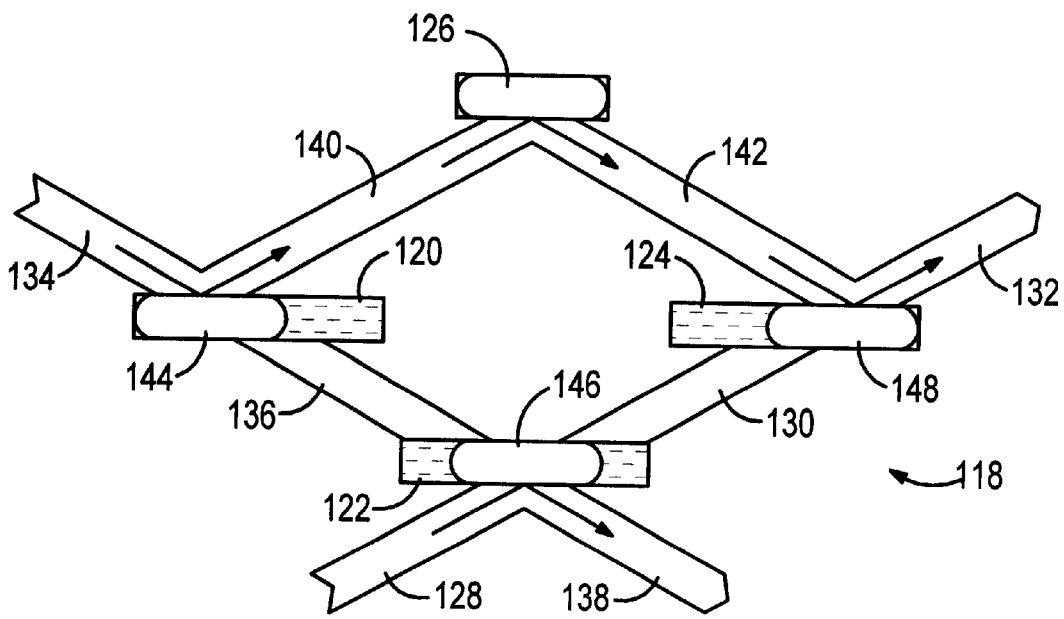
FIG. 8 is a top view of the switching arrangement of FIG. 7 shown in a signal-exchange state.

A third embodiment of an exchange switch 118 is shown in FIGS. 7 and 8. This embodiment utilizes three fluid-manipulable chambers 120, 122 and 124, as well as a steady-state reflector 126. A first linear transmission path is defined by an input waveguide 128, an intermediate waveguide 130 and an output waveguide 132. A second linear transmission path is formed by an input waveguide 134, a second intermediate waveguide 136 and an output waveguide 138. The exchange switch 118 also includes a pair of exchange waveguides 140 and 142 that intersect at the steady-state reflector 126.

When the exchange switch 118 is in the signal-continuation state of FIG. 7, there is fluid within each of the fluid-manipulable chambers 120, 122 and 124. Consequently, optical signals will propagate through the three chambers. Each of the transmission paths intersects two of the chambers, since the chamber 122 is common to both paths. An optical signal that is received along the input waveguide 128 of the first linear transmission path propagates through the chamber 122 to the intermediate waveguide 130 and through the chamber 124 to the output waveguide 132. Correspondingly, the optical signals received along the input waveguide 134 of the second transmission path propagate through the chamber 120 to the intermediate waveguide 136 and through the chamber 122 to the output waveguide 138.

When the exchange switch 118 is toggled to the signal-exchange state of FIG. 8, bubbles 144, 146 and 148 are formed in the three chambers 120, 122 and 124. Optical signals that are input at the input waveguide 128 of the first transmission path are reflected at the wall of the lower chamber 122 and to the output waveguide 138 of the second transmission path. On the other hand, optical signals that are received at the input waveguide 134 of the second transmission path are reflected at the chamber 120 to the exchange waveguide 140, are reflected at the reflector 126 to the second exchange waveguide 142, and are reflected at the chamber 124 to the output waveguide 132 of the first transmission path. Thus, when the switch 118 is in the signal-exchange state of FIG. 8, optical signals are reciprocally exchanged by the two transmission paths.

The embodiments of FIGS. 5–8 have been described with reference to unidirectional communication. However, both of the embodiments may be utilized with waveguides that provide bidirectional communications.

Figure 9:
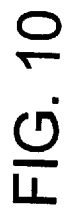
FIG. 9 is a schematic representation of the switching arrangement of FIGS. 3 and 4.
Figure 9:

The exchange switch 66 of FIGS. 3 and 4 is represented by the symbol shown in FIG. 9. The horizontal lines in the symbol represent the two parallel transmission paths of the switch, while the crossing diagonal lines represent the exchange waveguides 80 and 82.

Figure 10:
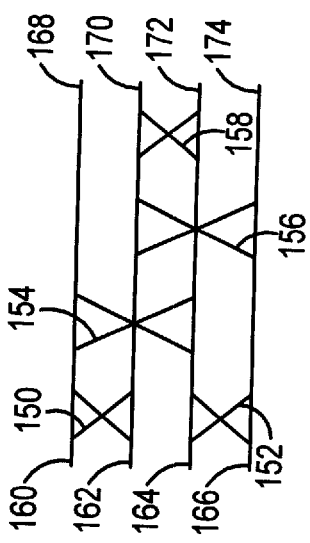
FIG. 10 is a schematic representation of a first topology of an optical switching network using a matrix of switching elements of FIGS. 3 and 4.

The symbol of FIG. 9 is used in the representation of a network topology in FIG. 10. By using five exchange switches 150, 152, 154, 156 and 158, any one of four input waveguides 160, 162, 164 and 166 can be optically coupled to any one of four output waveguides 168, 170, 172 and 174. For example, an optical signal that is received along waveguide 164 may be transferred to the top output waveguide 168 by placing the exchange switch 154 in the signal-exchange state while the switch 152 is in the signal-continuation state. On the other hand, the same optical signal can be transferred to the lowermost output waveguide 174 by placing the exchange switch 152 in the signal-exchange state and the exchange switch 156 in the signal-continuation state. With the switches 152 and 154 in the signal-continuation state and the switch 158 in the signal-exchange state, the same optical signals will be output via the output waveguide 170. Dependent upon the state of the five exchange switches 150–158, all possible arrangements of signal exchanges are realizable.

Figure 11:
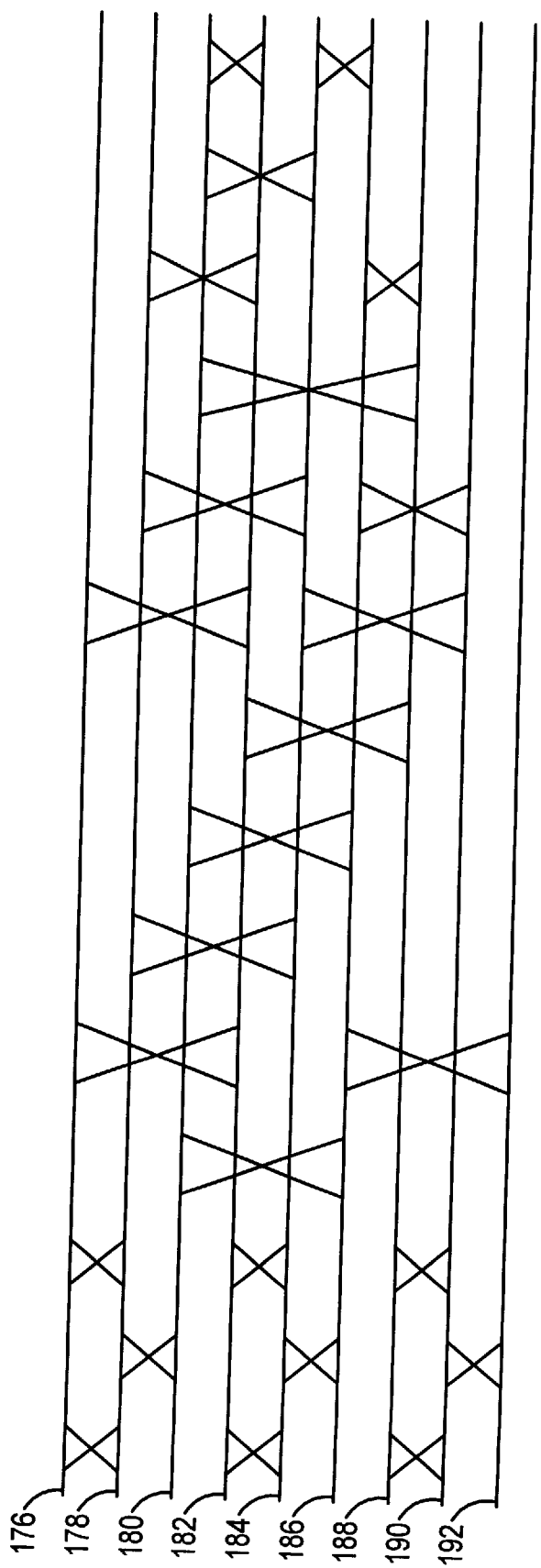
FIG. 11 is a schematic representation of a second optical switching network that utilizes a matrix of the switching arrangement of FIGS. 3 and 4.

A more complex exchange switching arrangement is shown in FIG. 11. Nine transmission paths 176, 178, 180, 182, 184, 186, 188, 190 and 192 are shown as being linked by a matrix of the exchange switches of FIGS. 3 and 4. By selectively setting the states of the various switches, all possible arrangements of signal exchanges are realizable.

The arrangements of FIGS. 10 and 11 are not considered to be inventive. The topologies are only illustrated for purposes of example. The exchange switch 66 of FIGS. 3 and 4 may be used in other topologies as well.

Figure 12:
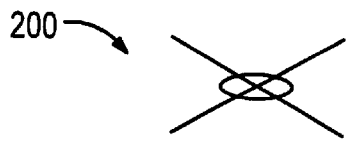
FIG. 12 is a schematic representation of a switching arrangement in accordance with the second or third embodiments shown in FIGS. 5–8.

FIG. 12 is used to represent either the exchange switch 92 of FIGS. 5 and 6 or the exchange switch 118 of FIGS. 7 and 8. The symbol will be referred to generically as an optical switching arrangement 200. The switching arrangement may be the combination of the trench 94 and the reflector 112 in FIGS. 5 and 6, may be the combination of the three trenches 120, 122 and 124 and the reflector 126 in FIGS. 7 and 8, or may be a different combination of reflection-enabling elements that achieve the reciprocal exchange operation.

Figure 13:
FIG. 13 is a schematic representation of a steady-state reflector for use in the network topologies of FIGS. 14 and 15.

FIG. 13 is a symbol of a steady-state reflector 202 that is used in addition to any single-state reflectors that are included in the optical switching arrangements. That is, the reflector that is symbolized by FIG. 13 is a reflection-enabling optical element that is used in addition to any reflectors of a switching arrangement such as the ones illustrated in FIGS. 5–8.

Figure 14:
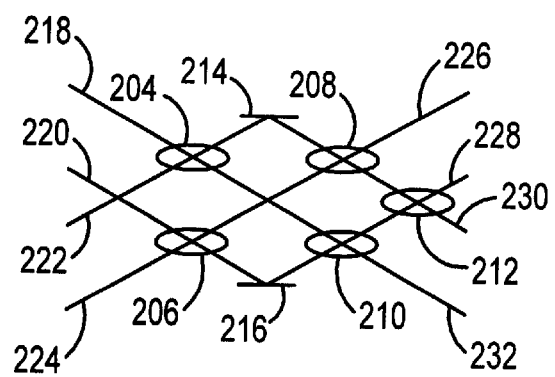
FIGS. 14 and 15 are schematic representations of two examples of network topologies using the optical arrangements of FIGS. 5–8.

FIG. 14 is an example of a network topology that utilizes optical switching arrangements 204, 206, 208, 210 and 212 and reflectors 214 and 216 to achieve signal exchanges. The topology includes four input waveguides 218, 220, 222 and 224 and four output waveguides 226, 228, 230 and 232. When all five of the switching arrangements 204–212 are in the signal-continuation state, signals introduced to the input waveguides 218, 220, 222 and 224 will be output via waveguides 232, 228, 230 and 226, respectively. By placing the optical switching arrangement 204 in the signal-exchange state, input waveguides 218 and 222 exchange optical coupling to the output waveguides 232 and 230. Alternatively, the input waveguide 218 can exchange output waveguides with input waveguide 220 by placing the optical switching arrangement 210 in the signal-exchange state. As a third alternative, optical switching arrangements 204, 206, 208 and 210 can all be placed in the signal-exchange state, causing input waveguides 218 and 224 to exchange output waveguides 232 and 226. As in FIGS. 10 and 11, all possible exchanges of signals are realizable.

Figure 15:
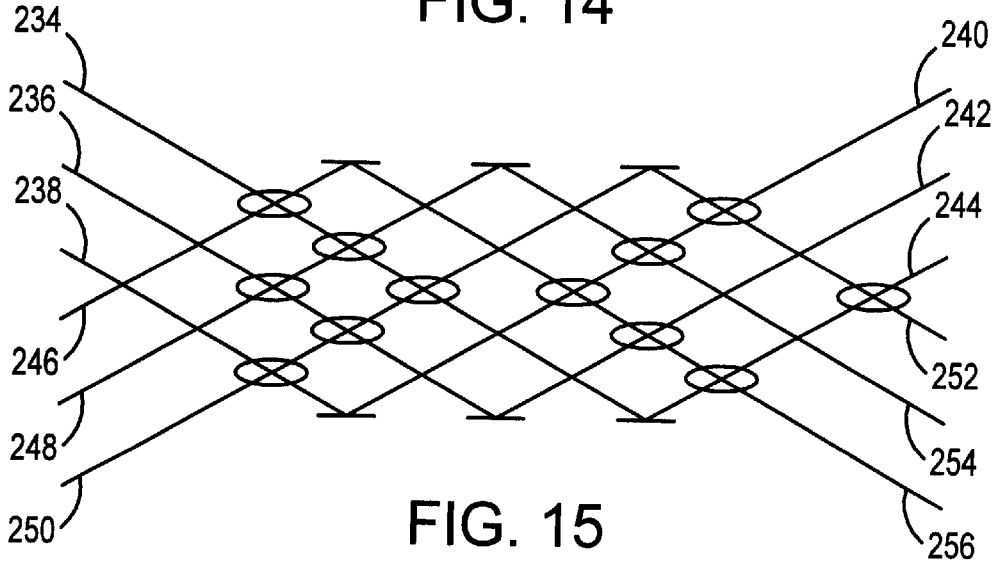

An alternative topology is shown in FIG. 15. Twelve optical switching arrangements are utilized in this topology. With all of the switching arrangements in a signal-continuation state, a first array of input waveguides 234, 236 and 238 is coupled to a first array of output waveguides 244, 242 and 240, respectively. Similarly, a second array of input waveguides 246, 248 and 250 is coupled to a second array of output waveguides 256, 254 and 252, respectively. However, by selectively changing the state of one or more of the optical switching arrangements, any two input waveguides will exchange output waveguides.

Figure 2:
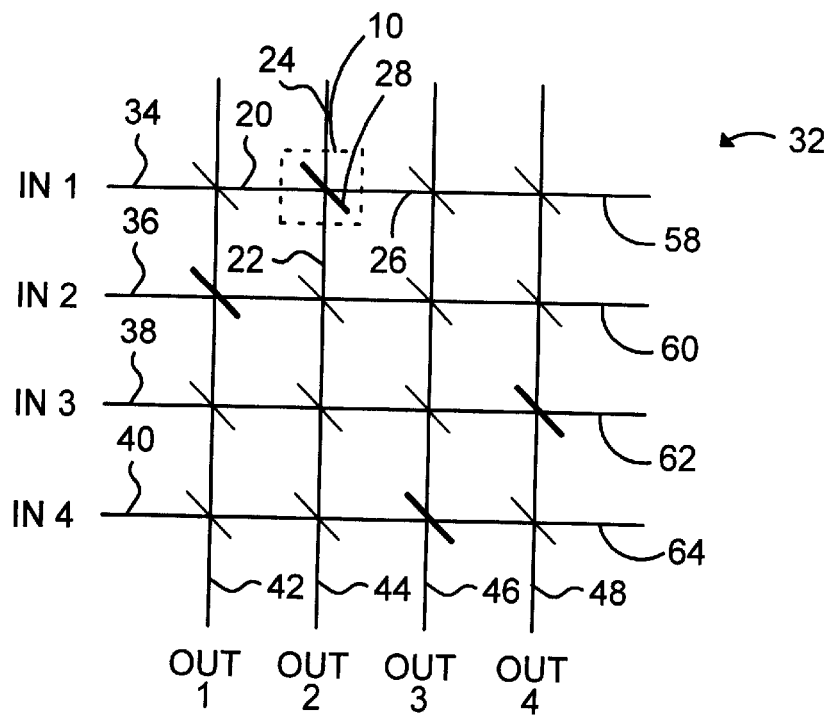
FIG. 2 is a 4×4 matrix of switching elements of FIG. 1 to allow connection of the input waveguides to the output waveguides of the matrix in accordance with the prior art.

While not shown in the figures, the versatility of the switching networks that utilize the exchange switches described above can be further enhanced by incorporating a matrix such as the one shown in FIG. 2 at either or both of the input and output ends of the exchange signal matrix. This enables test signals to be channeled into and out of the matrix and allows "dumping" of unused signals.

We claim:

1. An exchange switch for directing optical signals comprising:
   a first optical transmission path that Includes a first input waveguide and a first output waveguide, said first input and output waveguides being generally aligned;
   a second optical transmission path that includes a second input waveguide and a second output waveguide, said second input and output waveguides being generally aligned; and
   an optical switching arrangement having at least two states, including a signal-continuation state in which said first and second input waveguides are respectively coupled to said first and second output waveguides and including a signal-exchange state in which coupling is reversed such that an optical signal received at one of said first and second optical transmission paths is output via the other of said first and second optical transmission paths, said signal-continuation state being such that said first input and first output waveguides are optically coupled along said first optical transmission path and said second input and second output waveguides are optically coupled along said second optical transmission path, said signal-exchange state being such that said first input waveguide is optically coupled to said second output waveguide and said second input waveguide is optically coupled to said first output waveguide, said switching arrangement having a first fluid-manipulable chamber positioned within said first optical transmission path, said first chamber having fluid aligned with said first optical transmission path when said optical switching arrangement is in said signal-continuation state and having an absence of said fluid in alignment with said first optical transmission path when said optical switching arrangement is in said signal-exchange state.

2. The exchange switch of claim 1 wherein said switching arrangement includes first and second exchange waveguides positioned to receive reflected light when said switching arrangement is in said signal-exchange state, such that at least one of said first and second exchange waveguides is utilized in defining a path from said first input waveguide to said second output waveguide, said first and second exchange waveguides being substantially isolated from signal transmissions when said switching arrangement is in said signal-continuation state.

3. The exchange switch of claim 2 wherein said optical switching arrangement further includes a second fluid-manipulable chamber having fluid aligned with said second optical transmission path when said switching arrangement is in said signal-continuation state and having an absence of said fluid in alignment with said second optical transmission path when said switching arrangement is in said signal-exchange state, said first and second chambers having surfaces angled such that said first and second input waveguides are respectively coupled to said first and second exchange waveguides when said switching arrangement is in said signal-exchange state.

4. The exchange switch of claim 3 wherein each said first and second chamber includes a pair of surfaces along intersecting planes, said first input and first exchange waveguides intersecting at one of said surfaces and said first output and second exchange waveguides intersecting at the other of said surfaces of said first chamber, said second input and second exchange waveguides intersecting at one of said surfaces of said second chamber and said second output and first exchange waveguides intersecting at the other of said surfaces of said second chamber.

5. The exchange switch of claim 4 wherein said first and second exchange waveguides are arranged to define an X-shape.

6. The exchange switch of claim 2 wherein said switching arrangement includes a reflector, said first and second exchange waveguides intersecting at said reflector such that an optical signal propagating through said first exchange waveguide is reflected to said second exchange waveguide, said first input waveguide being optically coupled to said first exchange waveguide when said switching arrangement is in said signal-exchange state, said second exchange waveguide being optically coupled to said second output waveguide when said switching arrangement is in said signal-exchange state to define said path from said first input waveguide to said second output waveguide.

7. The exchange switch of claim 6 wherein said reflector is a chamber having a gas with a refractive index significantly different from a refractive index of said first and second exchange waveguides.

8. The exchange switch of claim 2 wherein said switching arrangement includes a second chamber that resides along both said first and second optical transmission paths, said switching arrangement further including a third fluid-manipulable chamber, said second chamber being along said second optical transmission path, said first chamber being along said first optical transmission path.

9. The exchange switch of claim 8 wherein:
   said first exchange waveguide intersects said first input waveguide at said first chamber;
   said first and second exchange waveguides intersect at a reflector; and
   said second exchange waveguide intersects said second output waveguide at said third chamber;
   such that when said switch arrangement is in said signal-exchange state, an optical signal from said first input waveguide is reflected at said second and third chambers in following a path that includes said first and second exchange waveguides and said second output waveguide.

10. An optical switching network comprising:
   at least three input waveguides for receiving optical signals;
   at least three output waveguides for outputting optical signals; and
   an array of reflection-enabling elements arranged such that said optical signals received at any one of said input waveguides are selectively directed to any one of said output waveguides, different pluralities of said reflection-enabling elements being operatively associated to form different exchange switches, each said exchange switch being dedicated to alternatively exchange optical coupling of a particular pair of said input waveguides with respect to a specific pair of said output waveguides based upon a presence or absence of fluid having a refractive index that substantially matches a refraction index of said input and output waveguides, said each exchange switch being configured to optically couple a first input waveguide to a first output waveguide and to optically couple a second input waveguide to a second output waveguide when said fluid is present between said input and output waveguides, said each exchange switch further being configured to optically couple said first input waveguide to said second output waveguide and to optically couple said second input waveguide to said first output waveguide when said fluid is absent between said input and output waveguides, said first input waveguide being substantially aligned with said first output waveguide and said second input waveguide being substantially aligned with said second output waveguide.

11. The network of claim 10 wherein each said exchange switch includes at least one fluid-manipulable chamber having a transmissive state and a reflective state, each said chamber enabling propagation of said optical signals therethrough when said each chamber is in said transmissive state and enabling redirection of said optical signals from a first transmission path to a second transmission path when said chamber is in said reflective state.

12. The network of claim 11 wherein said input waveguides include first and second pluralities of waveguides, said first plurality being non-parallel to said second plurality with respect to approach to said array of reflection-enabling elements, said reflection-enabling elements including steady-state reflectors.

13. The network of claim 12 wherein said output waveguides include a first plurality of waveguides that are non-parallel to a second plurality of waveguides with respect to departure from said array of reflection-enabling elements, said optical signals following a serpentine path between said input waveguides and one of said alternative output waveguides.

14. The network of claim 13 wherein each said optical signal propagates to at least two of said reflection-enabling elements irrespective of which said input waveguide receives said optical signal and which said output waveguide outputs said optical signal.

15. The network of claim 11 wherein each said input waveguide is generally aligned with an output waveguide and wherein substantially parallel transmission paths are formed from said input waveguides to said output waveguides via said array of reflection-enabling elements.

16. An exchange switch for directing optical signals comprising:
   a first transmission path having a core material for conducting optical signals;
   a second transmission path having said core material for conducting optical signals, said first and second transmission paths being generally parallel;
   a first switching member positioned to interrupt a continuation of said core material of said first transmission path, said first switching member having a transmissive state in which a fluid resides along said first transmission path and having a reflective state in which there is an absence of said fluid along said first transmission path;
   a second switching member positioned to interrupt a continuation of said core material of said second transmission path, said second switching member having a transmissive state in which a fluid resides along said second transmission path and having a reflective state in which there is an absence of said fluid along said second transmission path;
   a first exchange path having a first end that intersects said first transmission path at said first switching member to receive reflected light when said first switching member is in said reflective state, said first exchange path having a second end that intersects said second transmission path at said second switching member to transfer said reflected light; and
   a second exchange path having a first end that intersects said second transmission path at said second switching member to receive reflected light when said second switching member is in said reflective state, said second exchange path having a second end that intersects said first transmission path to transfer said reflected light.

17. The exchange switch of claim 16 wherein said first and second transmission paths are substantially parallel and wherein said first and second exchange paths define an X shape.

18. The exchange switch of claim 16 wherein said first and second switching members have a pair of walls that are impinged by said core material of first and second transmission paths, respectively, said walls being along intersecting planes.

19. The exchange switch of claim 16 wherein said walls form an angle in the range of 50 degrees to 140 degrees.

20. The exchange switch of claim 16 wherein said core material and said first and second switching members are fabricated on a semiconductor substrate.

* * * * *